US012637617B2

(12) United States Patent
Ranka et al.

(10) Patent No.: US 12,637,617 B2
(45) Date of Patent: May 26, 2026

(54) SOIL STABILIZING COMPOSITIONS

(71) Applicant: ZYDEX INC., Morrisville, NC (US)

(72) Inventors: Mikhil Ranka, Morrisville, NC (US); Moulik Ranka, Morrisville, NC (US)

(73) Assignee: ZYDEX INC., Morrisville, NC (US)

( * ) Notice: Subject to any disclaimer, the term of this patent is extended or adjusted under 35 U.S.C. 154(b) by 739 days.

(21) Appl. No.: 17/419,898

(22) PCT Filed: Dec. 30, 2019

(86) PCT No.: PCT/US2019/068920
§ 371 (c)(1),
(2) Date: Jun. 30, 2021

(87) PCT Pub. No.: WO2020/142419
PCT Pub. Date: Jul. 9, 2020

(65) Prior Publication Data

US 2022/0017823 A1 Jan. 20, 2022

Related U.S. Application Data

(60) Provisional application No. 62/787,218, filed on Dec. 31, 2018.

(51) Int. Cl.
*C09K 17/38* (2006.01)

(52) U.S. Cl.
CPC .................................... *C09K 17/38* (2013.01)

(58) Field of Classification Search
CPC ...................................................... C09K 17/38
USPC ............................. 404/71, 75, 76; 405/128.1
See application file for complete search history.

(56) References Cited

U.S. PATENT DOCUMENTS 3,195,273 A * 7/1965 Scott .................. A01G 13/0287 47/9
3,660,984 A * 5/1972 Anderson ............. C09K 17/42 405/264
4,931,319 A 6/1990 Stout et al.
5,273,666 A * 12/1993 Shu ...................... C09K 8/5755 507/233
5,595,957 A 1/1997 Bowey et al.
2006/0128839 A1* 6/2006 Ferrall ................... C09K 17/18 524/556
2008/0009644 A1* 1/2008 Ranka ................... C07F 7/1804 556/419

FOREIGN PATENT DOCUMENTS

AU 2005202108 A1 1/2005
EP 3360917 A1 8/2018
WO WO 2017111702 * 12/2016 ............ C08G 77/38

OTHER PUBLICATIONS

First Examination Report issued in corresponding Indian Application No. 202117034347 on Jun. 23, 2022, all enclosed pages cited.
International Search Report and Written Opinion of International Application No. PCT/US2019/068920 mailed May 13, 2020, all enclosed pages cited.
Second Written Opinion of International Application No. PCT/US2019/068920 mailed Nov. 19, 2020, all enclosed pages cited.
International Preliminary Report on Patentability of International Application No. PCT/US2019/068920 mailed Mar. 25, 2021, all enclosed pages cited.

* cited by examiner

*Primary Examiner* — Raymond W Addie
(74) *Attorney, Agent, or Firm* — BURR & FORMAN

(57) ABSTRACT

Compositions are provided that include at least one water soluble non-ionic organosilane. The compositions may further include at least one ionic organosilicon compound. The compositions may be provided in a liquid form. For instance, the compositions may comprise a aqueous dispersion or aqueous solution. Also provided are compositions including soil, at least one water soluble non-ionic organosilane, and/or at least one ionic organosilicon compound. Methods of stabilizing soil are also provided that include applying at least one water soluble non-ionic organosilane alone or in combination with at least one ionic organosilicon compound.

34 Claims, No Drawings

SOIL STABILIZING COMPOSITIONS

CROSS REFERENCE TO RELATED APPLICATION

This application claims priority to U.S. application No. 62/787,218 filed Dec. 31, 2018, the entire contents of which are hereby incorporated by reference in its entirety.

TECHNICAL FIELD

Embodiments of the presently-disclosed invention relate generally to compositions suitable for stabilization of soil, such as for the formation of roads. The compositions may include at least one ionic organosilicon compound and at least one water soluble non-ionic organosilane, in which the composition is provided in liquid form.

BACKGROUND

Stabilization of soil with various types of synthetic and natural chemical compositions is well known in the art for improving the physio-chemical properties of the soil. Common methods of stabilization include treatment of soil with bituminous emulsions, portland cement, lime, fly ash, synthetic fibers, and various types of resins. Treated or stabilized soils typically exhibit improved properties in terms of cohesivity and load bearing capacity, thereby making them more suitable for use in the construction of subbases and subgrades, dirt roads, civil foundations, unpaved parking lots, driveways, and others that those skilled in the art will recognize.

The most common method of stabilization is perhaps treatment with lime, which promotes $Ca^{2+}$ cationic exchange reactions with silica and alumina present in the soil. The exchange reaction induces agglomeration and flocculation of the soil, leading to moderate gains in strength and cohesivity. Lime treatment, however, has significant inherent drawbacks that include carbonation, sulfate attack, and environmental impact due to its corrosive nature. Most importantly, lime treated soils remain susceptible to damage caused by infiltration of water.

Cement is another method that is typically used to stabilize soils and improve its physio-chemical properties. By allowing for hydration of cement in the soil, significant gains in load bearing capacity can be achieved. Cement treated bases, however, are known to suffer from excessive cracking and poor fatigue resistance due to the stiffness of cement-soil network that is formed. Furthermore, similar to lime, cement does not significantly reduce water permeability of the treated soil, and hence is prone to carbonation and alkali-silica reaction attack. These significantly diminish the cement-soil network, eventually causing failure.

Other soil stabilization technologies include the use of bituminous emulsions, enzymes, synthetic fibers, water based latexes, and natural resins. While they have been shown to improve the load bearing capacity of soils to varying degrees, they all lack an ability to significantly mitigate the deterioration in properties due to the ingress of water.

One of the main challenges soil stabilization is the deterioration of the soil properties due to the ingress of water. Clayey soils, for example, absorb a significant amount of water causing them to swell. Upon drying, the soil shrinks. Repeated cycles of such expansion and contraction as a function of water leads to cracking and increased stress on surrounding structures. Furthermore, cracking leads to even more damage by subsequently enabling even deeper water penetration. In this regard, the inability to limit soil expansivity is one of the leading causes of uneven road surfaces, potholes, ruts, corrugations cracked home foundations, and poor life cycle on asphalt driveways.

As described above, there are two main challenges for effective soil stabilization: improved load bearing capacity, which is typically achieved by increased density of the compacted mass (i.e., Higher MDD—Maximum Dry Density) and including stiff materials like Cement/Fibers, and decreased hydraulic conductivity and soil swelling to mitigate damage from water.

Therefore, there remains a need in the art for compositions suitable for stabilization of soil, in which the compositions may increase maximum dry density and/or minimize soil expansivity by preventing the ingress or absorption of water by the soil (e.g., reduced free swell of the soil).

SUMMARY OF INVENTION

One or more embodiments of the invention may address one or more of the aforementioned problems. Certain embodiments according to the invention provide compositions suitable for stabilization of soil, such as for the formation of roads. The compositions may include at least one ionic organosilicon compound (e.g., a cationic organosilicon compound) and at least one water soluble non-ionic organosilane. In accordance with certain embodiments of the invention, the compositions may be provided in liquid form, such as an aqueous solution or dispersion. In accordance with certain embodiments of the invention, the at least one water soluble non-ionic organosilane may comprise a transesterified alkoxy silane, an inherently or naturally water soluble organosilane, or combinations thereof. The at least one water soluble non-ionic organosilane may comprise a solubility in water of at least about 2.5 grams per Liter (g/L) of water at a temperature of 20° C., such as at least about 10 g/L, at least about 20 g/L, or at least about 50 g/L. In accordance with certain embodiments of the invention, the at least one water soluble non-ionic organosilane may comprise a solubility in water at 20° C. from at least about any of the following: 5, 10, 15, 20, 25, 30, 35, 40, 45, 50, 55, and 60 g/L and/or at most about 150, 140, 130, 120, 110, 100, 90, 80, 70, and 60 g/L. In accordance with certain embodiments of the invention, the composition may comprise less than 10% by weight, such less than 5% by weight, or less than 1% by weight of an organic solvent. In accordance with certain embodiments of the invention, the composition may be devoid of an organic solvent.

In another aspect, the present disclosure provides a soil-containing composition comprising soil and at least one water soluble non-ionic organosilane as disclosed herein. In accordance with certain embodiments of the invention, the soil-containing composition may also include at least one ionic organosilicon compound (e.g., a cationic organosilicon compound). In accordance with certain embodiments of the invention, the soil-containing composition may be provided in the form of a road.

In another aspect, the present disclosure provides a process for the stabilization of soil. In accordance with certain embodiments of the invention, the process may comprise a step of applying at least one water soluble non-ionic organosilane as disclosed herein to a surface (e.g., an exposed surface) of a plot of soil, in which the at least one water soluble non-ionic organosilane is provided in liquid form. In accordance with certain embodiments of the invention, the application of the at least one water soluble non-ionic organosilane is provided in liquid form may comprise spraying a liquid composition including the at least one water soluble non-ionic organosilane onto the soil. In accordance with certain embodiments of the invention, the method may additionally or alternatively comprise scarifying a cement and the at least one water soluble non-ionic organosilane (alone or in combination with at least one ionic organosilicon compound) together in the soil.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to compositions suitable for stabilization of soil, such as for the formation of roads. In accordance with certain embodiments of the invention, the compositions may provide one or more (e.g., all) of the following benefits: easy to apply, environmentally friendly, no leaching, develops hydrophobicity quickly, increases compaction density (MDD), can be shipped without solvent, and penetrates significantly into soil. In accordance with certain embodiments of the invention, the compositions may comprise one or more water soluble organosilane alone or in combination with one or more ionic organosilicon compound. Compositions including ionic organosilicon compounds alone may provide excellent hydrophobicity, but do not penetrate particularly deep due to their ionic nature. For instance, cationic organosilicon compounds alone lack good penetration and/or distribution in soil, which is typically anionic in nature. This lack of good penetration and/or distribution limits the hydrophobicity developed on the soil, particularly soil that is increasingly further away from the point or surface of application. Furthermore, since ionic organosilicon compounds are ionic salts that are solid, they require suspension/solubilization in a solvent that is potentially volatile and does not serve any purpose in improving the properties of the soil. In this regard, certain embodiments in accordance with the invention may comprise compositions including a liquid organosilane (e.g., water soluble organosilanes or transesterified alkoxy silanes) that provide deeper penetration into soil and enable a shippable and/or usable composition that does not contain any solvent.

Traditional organosilane waterproofing agents are not water soluble. Typical examples include methyltrimethoxy silane (MTMS), propyltrimethoxy silane (PTMO), isobutyltrimethoxy silane (IBTMO), octadecyltrimethoxy silane (OTMO). In accordance with certain embodiments of the invention, however, such traditional non-water soluble organosilane waterproofing agents may be modified by a transesterification reaction, which swaps out, for example, the methoxy or ethoxy groups on a typical alkoxy silane for hydrophilic compounds that have hydroxyl groups. It is well established that in organosilane chemistry, for instance, that a silane-alkoxy group (i.e., Si—OR) is known as a silane ester and that a transesterification reaction is an exchange reaction in which two different alkoxy groups are exchanged with each other. For example, if Si—$OCH_3$ $_{is}$ reacted with $HOCH_2CH_2OH$ the methoxy group is exchanged with mono ethylene glycol resulting in the formation of Si—$OCH_2CH_2OH$ by the transesterification reaction. As discussed in more detail below, a variety of hydroxyl-containing compounds (e.g., simple hydrophilic alcohols including monoethylene glycol (MEG), diethylene glycol (DEG), glycerol, sorbitol, dimethylolpropionic acid etc.) may be used to swap out/exchange one or more of the silane-alkoxy groups of traditional non-water soluble organosilane waterproofing agents with a functional moiety (e.g., one or more hydroxyl groups) that imparts a more polar and/or water soluble nature to the resulting transesterified organosilane, in which the resulting transesterified organosilane may have a water solubility as described herein. In accordance with certain embodiments of the invention, such transesterified organosilanes (i.e., the resulting transesterified non-ionic organosilanes) exhibit a sufficient level of water solubility such that when provided in combination (e.g., in an aqueous liquid composition) with an ionic organosilane (e.g., ionic organosilicon compound) good solubility of the overall liquid composition (e.g., aqueous mixture or dispersion) may be achieved. For example, the water soluble non-ionic organosilane (e.g., the resulting transesterified non-ionic organosilanes) may comprise a sufficiently large water solubility such that the water soluble non-ionic organosilane may be provided in liquid form (e.g., dissolved in an aqueous medium) and act as a solvent or carrier for the ionic organosilane (e.g., ionic organosilicon compound). In soil stabilization applications, for instance, the water soluble non-ionic organosilane may act as a solvent or carrier for the ionic organosilane (e.g., ionic organosilicon compound) and facilitate a greater depth of penetration into and through soil, which is typically anionic in nature, for the ionic organosilane (e.g., ionic organosilicon compound) that provides desirable water repellant properties to the soil to prevent ingress of water. In accordance with certain embodiments of the invention, the water soluble non-ionic organosilane may additionally or in the alternative comprise a naturally or inherently water soluble non-ionic organosilane. In this regard, deeper penetration of soil by the water soluble non-ionic organosilane (e.g., the resulting transesterified non-ionic organosilanes and/or naturally or inherently water soluble non-ionic organosilanes) and/or the ionic organosilane (e.g., ionic organosilicon compound) may provide increased soil densification and/or resistance to water ingress to provide a bi-functional mode of operation in imparting improved soil stabilization.

In accordance with certain embodiments of the invention, the liquid compositions may comprise a combination of at least one ionic organosilicon compound (e.g., a cationic organosilicon compound) and at least one water soluble non-ionic organosilane, in which the liquid composition may be significantly non-ionic and substantial gains in penetration of the organosilanes in soil may be realized. Furthermore, the water soluble non-ionic organosilanes of compositions in accordance with certain embodiments of the invention may be substantially lower in molecular weight and have significantly higher molar densities per unit mass, which may further contribute to increased hydrophobicity in a substantial manner. In accordance with certain embodiments of the invention, for example, the molar density per unit mass of the water soluble non-ionic organosilane may comprise from about 0.5 mol/kg to about 6 mol/kg, such as from at least about any of the following: 0.5, 0.6, 0.7, 0.8, 0.9, 1.0, 1.1, 1.2, 1.3, 1.4, and 1.5 mol/kg and/or at most about 6, 5.5, 5, 4.5, 4, 3.5, 3, 2.5, 2, 1.75, and 1.5 mol/kg.

Additionally and as noted above, the water soluble non-ionic organosilane may comprise a liquid and serve as a solvent or carrier for the ionic organosilicon compound of the compositions in accordance with certain embodiments of the invention.

In accordance with certain embodiments of the invention, compaction densities of soils are beneficially increased when treated with compositions disclosed herein. In this regard, increased compaction densities of soils that have been treated in accordance with certain embodiments of the invention, for example, highlight the surprisingly usefulness of compositions disclosed herein for soil stabilization applications (e.g., road formation). In this regard, a higher density of a compacted base (e.g., a base layer formed from compacted soil) allows for significant strength gains. In accordance with certain embodiments of the invention, the higher the level of the water soluble non-ionic organosilane in a given composition may provide a higher gain in compacted soil density and strength properties, which is believed to be at least partially related to the improved penetration and distribution of the silanes into and/or through the soil. In accordance with certain embodiments of the invention, the realization of increased soil compaction densities result in the formation of higher load bearing capacities for roads formed therefrom.

In accordance with certain embodiments of the invention, water soluble non-ionic organosilanes alone or in combination with ionic organosilicon compounds may be particularly desirable in a variety of soil stabilization applications by imparting improved hydrophobicity, depth of penetration into soil, and compaction benefits. In accordance with certain embodiments of the invention, the water soluble non-ionic organosilanes alone or in combination with ionic organosilicon compounds may be formulated in conjunction with a variety of surfactants that would carry them into water stably. In accordance with certain other embodiments of the invention, the water soluble non-ionic organosilanes alone or in combination with ionic organosilicon compounds may be in the form of cohydrolysates. In accordance with certain other embodiments of the invention, the water soluble non-ionic organosilanes alone or in combination with ionic organosilicon compounds may be in the form of cohydrolysates with, for example, Tetraethylorthosilicate (TEOS) and/or Tetramethylorthosilcate (TMOS) and/or transesterified versions of Tetraethylorthosilicate (TEOS) and/or Tetramethylorthosilcate (TMOS).

As noted above, certain embodiments according to the invention provide compositions suitable for stabilization of soil, such as for the formation of roads. The compositions may include at least one ionic organosilicon compound (e.g., a cationic organosilicon compound) and at least one water soluble non-ionic organosilane. In accordance with certain embodiments of the invention, the compositions may be provided in liquid form, such as an aqueous solution or dispersion. In accordance with certain embodiments of the invention, the at least one water soluble non-ionic organosilane may comprise a transesterified alkoxy silane, an inherently or naturally water soluble organosilane, or combinations thereof. The at least one water soluble non-ionic organosilane may comprise a solubility in water of at least about 2.5 grams per Liter of water at a temperature of 20° C., such as at least about 10 g/L, at least about 20 g/L, or at least about 50 g/L. In accordance with certain embodiments of the invention, the at least one water soluble non-ionic organosilane may comprise a solubility in water at 20° C. from at least about any of the following: 5, 10, 15, 20, 25, 30, 35, 40, 45, 50, 55, and 60 g/L and/or at most about 150, 140, 130, 120, 110, 100, 90, 80, 70, and 60 g/L. In accordance with certain embodiments of the invention, the composition may comprise less than 10% by weight, such less than 5% by weight, or less than 1% by weight of an organic solvent. In accordance with certain embodiments of the invention, the composition may be devoid of an organic solvent.

The at least one water soluble non-ionic organosilane, in accordance with certain embodiments of the invention, may comprise a transesterified alkoxy silane, for example, having a structure according to Formula (1)

Formula (1)

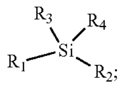

wherein $R_1$ comprises a substituted or non-substituted hydrocarbon radical; $R_2$ comprises a first hydroxyl-containing alkoxy radical; $R_3$ comprises an alkoxy radical or a second hydroxyl-containing alkoxy radical; and $R_4$ comprises an alkoxy radical or a third hydroxyl-containing alkoxy radical. In accordance with certain embodiments of the invention, the first hydroxyl-containing alkoxy radical, the second hydroxyl-containing alkoxy radical, the third hydroxyl-containing may be identical. Alternatively, the first hydroxyl-containing alkoxy radical may be different than at least the second hydroxyl-containing alkoxy radical. In accordance with certain embodiments of the invention, $R_1$ comprises an alkyl radical. For example, the alkyl radical may comprise a linear alkyl radical, a branched alkyl radical, or a cycloalkyl radical including from one to thirty carbon atoms (e.g., at most about 30, 25, 20, 18, 16, 14, 12, 10, and 8 carbon atoms and/or at least about 1, 2, 3, 4, 5, 6, 7, 8, 9, 10, and 12 carbon atoms). In accordance with certain embodiments of the invention, $R_1$ may comprise a substituted hydrocarbon radical having one or more of a halide atom, a nitrogen atom, or an oxygen atom.

In accordance with certain embodiments of the invention, hydroxyl-containing alkoxy radicals of the transesterified alkoxy silane according to Formula (1) comprises $-(OCH_2CH_2)_aOH$ where 'a' has a value of 1 through 10 (e.g., 1, 2, 3, 4, 5, 6, 7, 8, 9, or 10), $-[OC_3H_6]_bOH$ where 'b' has a value of 1 through 10 (e.g., 1, 2, 3, 4, 5, 6, 7, 8, 9, or 10), or $[C_3H_7O_3]$, $[C_6H_{13}O_6]$, $[C_5H_{11}O_4]$ and $[C_4H_6O_3]$. The transesterified alkoxy silane, in accordance with certain embodiments of the invention, may comprise the first hydroxyl-containing alkoxy radical and the second hydroxyl-containing alkoxy radical, in which the first hydroxyl-containing alkoxy radical and the second hydroxyl-containing alkoxy radical each independently comprise $-(OCH_2CH_2)_aOH$ where 'a' has a value of 1 through 10 (e.g., 1, 2, 3, 4, 5, 6, 7, 8, 9, or 10), $[OC_3H_6]_bOH$ where 'b' has a value of 1 through 10 (e.g., 1, 2, 3, 4, 5, 6, 7, 8, 9, or 10), or $[C_3H_7O_3]$, or $[C_6H_{13}O_6]$, or $[C_5H_{11}O_4]$, or $[C_4H_6O_3]$.

Compositions in accordance with certain embodiments of the invention may additionally or alternatively comprise at least one water soluble non-ionic organosilane that is inherently or naturally a water soluble organosilane. In this regard, compositions in accordance with certain embodiments of the invention may comprise both transesterified alkoxy silane and inherently or naturally water soluble organosilanes. For example, the at least on water soluble non-ionic organosilane may comprise one or more transesterified alkoxy silane and one or more inherently or naturally water soluble organosilanes. In accordance with certain embodiments of the invention, the at least one water soluble non-ionic organosilane (e.g., one or more transesterified alkoxy silane and/or one or more inherently or naturally water soluble organosilanes) comprises a solubility in water of at least about 2.5 grams per Liter of water at a temperature of 20° C. In accordance with certain embodiments of the invention, the at least one water soluble non-ionic organosilane (e.g., one or more transesterified alkoxy silane and/or one or more inherently or naturally water soluble organosilanes) may comprise a solubility in water at 20° C. from at least about any of the following: 5, 10, 15, 20, 25, 30, 35, 40, 45, 50, 55, and 60 g/L and/or at most about 150, 140, 130, 120, 110, 100, 90, 80, 70, and 60 g/L.

In accordance with certain embodiments of the invention, the at least one water soluble non-ionic organosilane may comprise a structure according to the following Formula (2):

$$A_{(4-n)}SiY_n; \quad \text{Formula (2):}$$

wherein 'A' comprises a monovalent organic radical, such as a monovalent organic radical including at least amine functionality, 'Y' comprises a hydrolyzable radical or hydroxyl group, and n is 1, 2, or 3. In accordance with certain embodiments of the invention, 'A' comprises an alkyl or aryl radical. 'Y', in accordance with certain embodiments of the invention, may comprise a hydroxyl group or radicals that hydrolyze in the presence of water including acetoxy radicals and alkoxy radicals with 1 to 6 carbon atoms. In this regard, in accordance with certain embodiments of the invention, the at least one water soluble non-ionic organosilane may comprise an amino-functional silane. For example, the amino-functional silane may comprise N-(2-aminoethyl)-3-aminopropyltrimethoxysilane, N-(aminoethylaminomethyl)phenyltrimethoxysilane, N-(2-aminoethyl)-3-aminopropyltris(2-ethylhexoxy)-silane, 3-aminopropyltrimethoxysilane, trimethoxysilyl-propyldiethylenetriamine, bis (2-hydroxyethyl)-3-aminopropyltrimethoxysilane or any combinations thereof.

In accordance with certain embodiments of the invention, the composition comprises at least one water soluble non-ionic organosilane comprising a transesterified alkoxy silane and at least one inherently or naturally water soluble non-ionic organosilane as disclosed herein. The composition, for example, may comprise an aqueous solution or aqueous dispersion even if the composition includes at least one ionic organosilicon compound. For instance, the composition may comprise less than 10% by weight, such less than 5% by weight, or less than 1% by weight of an organic solvent. The composition, in accordance with certain embodiments of the invention, may be devoid of an organic solvent.

Compositions, in accordance with certain embodiments of the invention, may comprise a weight ratio between the at least one water soluble non-ionic organosilane and the at least one ionic organosilicon compound comprising from about 98:2 to about 2:98; such as at most about any of the following: 95:5, 90:10, 85:15, 80:20, 75:25, 70:30, 65:45. 60:40, 55:45, 50:50, 45:55, and 40:60 and/or at least about any of the following: 2:98. 5:95, 10:90, 15:85, 20:80, 25:75, 30:70, 35:65, 40:60, 45:55, 50:50, 55:45, and 60:40.

In accordance with certain embodiments of the invention, the composition comprises at least one ionic organosilicon compound, such as a cationic organosilicon compound. The at least one ionic organosilicon compound may comprise a structure according to Formulae (3).

Formulae (3)

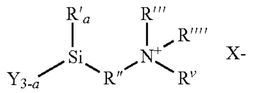

wherein in each formula of Formulae (3),

Y is an alkoxy radical or a hydroxyl-containing alkoxy radical;

'a' has a value of 0, 1, or 2;

R' is an alkyl radical, such as having 1, 2, 3, 4, 5, or 6 carbon atoms;

R'' is an alkylene group, such as having 1, 2, 3, 4, 5, or six carbon atoms,

R''', R'''' are alkyl groups containing 1 to 22 carbon atoms, wherein at least one of R''' and R'''' is larger than eight carbon atoms, $—CH_2C_6H_5$, $—C_2CH_2OH$, $—C_2OH$, and $—(CH_2)NHC(O)R^{vi}$ wherein x has a value of from two to ten and $R^{vi}$ is a perfluoroalkyl radical having one to twelve carbon atoms;

X is chloride, bromide, fluoride, iodide, acetate or tosylate;

In accordance with certain embodiments of the invention, the composition includes a cationic organosilicon compound comprising a structure according to Formula (4).

Formula (4)

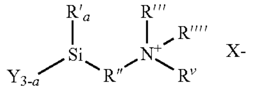

wherein Y is a methyl or ethyl alkoxy radical; 'a' has a value of zero; R'' is propylene; R''' is methyl or ethyl; R'''' and $R^v$ are identical or different alkyl groups containing from one to twenty-two carbon atoms, wherein at least one of R''' and R'''' is larger is larger than eight carbon atoms; and X is a halide, acetate, or tosylate.

The cationic organosilicon compound, in accordance with certain embodiments of the invention, may comprises 3-(trimethoxysilyl)propyldimethyloctadecyl ammonium chloride, 3-(trimethoxysilyl)propylmethyldidecyl ammonium chloride, or 3-(trimethoxysilyl)propyldimethylhexadecyl ammonium chloride.

The composition, in accordance with certain embodiments of the invention, may comprise the combination of the at least one ionic organosilicon compound and the at least one water soluble non-ionic organosilane, in which the sum of the at least one ionic organosilicon compound and the at least one water soluble non-ionic organosilane comprises from about 5 to about 100% dissolved and/or suspended solids by weight, such from at least about any of the following: 5, 10, 15, 20, 25, 30, 35, 40, 45, 50, 55, and 60% dissolved and/or suspended solids by weight and/or at most about 100, 95, 90, 85, 80, 75, 70, 65, and 60% dissolved and/or suspended solids by weight. In this regard, the % dissolved and/or suspended solids by weight may be determined by adding the weight of dry solids attributed to the at least one ionic organosilicon compound and the at least one water soluble non-ionic organosilane in a given volume of composition, divided by the total weight of that volume of the composition multiplied by 100. Such embodiments, for example, may comprise a concentrate that can be easily shipped or transported to locations in need of such compositions (e.g., road construction sites) without the added cost and difficulty of shipping undesirably large weights of solvents. In this regard, the concentrate may be diluted with water at the site of need (e.g., road construction site) to a desired % dissolved and/or suspended solids level for treating a portion of soil as part of a process of stabilizing the soil for road formation.

The composition, in accordance with certain embodiments of the invention, may comprise the combination of the at least one ionic organosilicon compound and the at least one water soluble non-ionic organosilane, in which the sum of the at least one ionic organosilicon compound and the at least one water soluble non-ionic organosilane comprises from about 0.1% to about 5% dissolved and/or suspended solids by weight, such from at least about any of the following: 0.1, 0.2, 0.25, 0.5, 0.75, 1, 1.25, 1.5, 1.75, 2.0, 2.25, 2.5, 2.75, 3.0, 3.25, 3.5, 3.75, and 4.0% dissolved and/or suspended solids by weight and/or at most about 5, 4.75, 4.5, 4.25, 4.0, 3.75, 3.5, 3.25, and 3% dissolved and/or suspended solids by weight. In this regard, the % dissolved and/or suspended solids by weight may be determined by adding the weight of dry solids attributed to the at least one ionic organosilicon compound and the at least one water soluble non-ionic organosilane in a given volume of composition, divided by the total weight of that volume of the composition multiplied by 100. Such embodiments, for example, may comprise a final composition that can be applied (e.g., sprayed) onto a portion of soil, for example at a road construction sites.

Compositions, in accordance with certain embodiments of the invention, may further comprise at least one surfactant, such as an anionic surfactant, cationic surfactant, zwitterionic surfactant, or any combination thereof. In accordance with certain other embodiments of the invention, the water soluble non-ionic organosilanes alone or in combination with ionic organosilicon compounds may be in the form of cohydrolysates. In accordance with certain other embodiments of the invention, the water soluble non-ionic organosilanes alone or in combination with ionic organosilicon compounds may be in the form of cohydrolysates with Tetraethylorthosilicate (TEOS) and/or Tetramethylorthosilcate (TMOS) and/or transesterified versions of Tetraethylorthosilicate (TEOS) and/or Tetramethylorthosilcate (TMOS).

Compositions, in accordance with certain embodiments of the invention, may further a soil to provide a soil-containing composition. The soil, for example, may comprise gravel, sand, silt, clay, or any combination thereof. Different soil types are classified under the Unified Soil Classification System (USCS) with a two letter code. The first letter choices are G—gravel, S—sand, M—silt, C—clay, O—organic, and the second letter choices are P—poorly graded, W—well graded, H—high plasticity, L—low plasticity. The group symbols are GW, GP, GM, GC, SW, SP, SM, SC, ML, CL, OL, MH, CH, and OH. In this regard, compositions in accordance with certain embodiments of the invention may include any one of GW, GP, GM, GC, SW, SP, SM, SC, ML, CL, OL, MH, CH, and OH soils.

In accordance with certain embodiments of the invention, the soil-containing composition comprises a weight percent, determined on a dry basis, of the sum of the at least one ionic organosilicon compound and the at least one water soluble non-ionic organosilane from about 0.05 to about 5% by weight of the soil-containing composition on a dry basis, such as at least about any of the following: 0.05, 0.07, 0.09, 1, 1.25, 1.5, 1.75, 2, 2.25, 2.5, 2.75, 3.0, 3.25, 3.5, 3.75, and 4.0% by weight of the soil-containing composition on a dry basis dissolved and/or suspended solids by weight and/or at most about 5, 4.75, 4.5, 4.25, 4.0, 3.75, 3.5, 3.25, and 3% by weight of the soil-containing composition on a dry basis. By way of example, certain embodiments of the invention comprise a soil-containing composition in which the sum of the at least one ionic organosilicon compound and the at least one water soluble non-ionic organosilane account for about 0.005 to 5% by weight determined on a dry basis.

In accordance with certain embodiments of the invention, the composition may comprise a maximum dry density (MDD) of at least about 1.5 gm/cc as determined by the proctor density measurement test, such as from about 1.5 gm/cc to about 3 gm/cc, or such as at least about any of the following: 1.5, 1.6, 1.7, 1.8, 1.9, 2.0, 2.1, 2.2, 2.3, and 2.4 gm/cc and/or at most about 3, 2.9, 2.8, 2.7, 2.6, 2.5, 2.4, 2.3, 2.2, 2.1, and 2.0 gm/cc.

As referenced above, the present disclosure provides soil-containing compositions including soil as disclosed herein and at least one water soluble non-ionic organosilane as disclosed herein. In accordance with certain embodiments of the invention, the soil-containing composition may also include at least one ionic organosilicon compound (e.g., a cationic organosilicon compound) as disclosed previously herein. In accordance with certain embodiments of the invention, the soil-containing composition may be provided in the form of a road. The at least one water soluble non-ionic organosilane may comprise a transesterified alkoxy silane, an inherently or naturally water soluble organosilane, or any combination thereof as previously disclosed herein. In accordance with certain embodiments of the invention, the soil may comprise gravel, sand, silt, clay, or any combinations thereof. In accordance with certain embodiments of the invention, the soil-containing composition comprises a weight percent, determined on a dry basis, of the sum of the at least one ionic organosilicon compound and the at least one water soluble non-ionic organosilane from about 0.05 to about 5% by weight of the soil-containing composition on a dry basis, such as at least about any of the following: 0.05, 0.07, 0.09, 1, 1.25, 1.5, 1.75, 2, 2.25, 2.5, 2.75, 3.0, 3.25, 3.5, 3.75, and 4.0% by weight of the soil-containing composition on a dry basis dissolved and/or suspended solids by weight and/or at most about 5, 4.75, 4.5, 4.25, 4.0, 3.75, 3.5, 3.25, and 3% by weight of the soil-containing composition on a dry basis. By way of example, certain embodiments of the invention comprise a soil-containing composition in which the sum of the at least one ionic organosilicon compound and the at least one water soluble non-5 ionic organosilane account for about 0.005 to 5% by weight determined on a dry basis. In accordance with certain embodiments of the invention, the composition may comprise a maximum dry density (MDD) of at least about 1.5 gm/cc as determined by the proctor density measurement test, such as from about 1.5 gm/cc to about 3 gm/cc, or such as at least about any of the following: 1.5, 1.6, 1.7, 1.8, 1.9, 2.0, 2.1, 2.2, 2.3, and 2.4 gm/cc and/or at most about 3, 2.9, 2.8, 2.7, 2.6, 2.5, 2.4, 2.3, 2.2, 2.1, and 2.0 gm/cc.

In another aspect, the present disclosure provides a process for the stabilization of soil. In accordance with certain embodiments of the invention, the process may comprise a step of applying at least one water soluble non-ionic organosilane as disclosed herein to a surface (e.g., an exposed surface) of a plot of soil, in which the at least one water soluble non-ionic organosilane is provided in liquid form. In accordance with certain embodiments of the invention the application of the at least one water soluble non-ionic organosilane is provided in liquid form may comprise spraying a liquid composition including the at least one water soluble non-ionic organosilane onto, for example, an outer most surface of a plot of soil. As previously discussed the at least one water soluble non-ionic organosilane may comprise a transesterified alkoxy silane, an inherently or naturally water soluble organosilane, or any combination thereof such as any water soluble non-ionic organosilane(s) disclosed herein. In accordance with certain embodiments of the invention, the process may additionally or alternatively comprise scarifying a cement and the at least one water soluble non-ionic organosilane (alone or in combination with at least one ionic organosilicon compound) together in the soil.

In accordance with certain embodiments of the invention, the process may comprise applying one or more of the compositions disclosed herein to a surface of a plot of soil (e.g., such as a portion of soil used for road formation). For instance, the at least one water soluble non-ionic organosilane and/or the at least one ionic organosilicon compound may be pre-formulated to form a liquid composition as described and disclosed herein. As previously noted, the composition may be applied (e.g., spray coated) onto soil and allowed to penetrate into the depth of the soil. In accordance with certain embodiments of the invention, the process may additionally or alternatively comprise scarifying a cement and the at least one water soluble non-ionic organosilane (alone or in combination with at least one ionic organosilicon compound) together in the soil.

In accordance with certain embodiments of the invention, the process may comprise compacting the plot of soil prior to applying the at least one water soluble non-ionic organosilane (e.g., a composition as disclosed herein), after the application of the at least one water soluble non-ionic organosilane (e.g., a composition as disclosed herein), or both. For instance, the step of applying the at least one water soluble non-ionic organosilane, applying the at least one ionic organosilicon compound, or both comprises spraying the exposed surface of the plot with the at least one water soluble non-ionic organosilane and/or the at least one ionic organosilicon compound. In accordance with certain embodiments of the invention, the process may additionally or alternatively comprise scarifying a cement and the at least one water soluble non-ionic organosilane (alone or in combination with at least one ionic organosilicon compound) together in the soil. After a given period of time, the composition including the at least one water soluble non-ionic organosilane and/or the at least one ionic organosilicon compound penetrates into and through a depth of the soil and develops hydrophobicity to prevent ingress of water into the soil along the depth of penetration. The soil treated with the composition including the at least one water soluble non-ionic organosilane and/or the at least one ionic organosilicon compound may be compacted to increase the density of the soil.

EXAMPLES

The present disclosure is further illustrated by the following examples, which in no way should be construed as being limiting. That is, the specific features described in the following examples are merely illustrative and not limiting.

Example 1—Fully Ionic Composition

A two liter, three necked pressure reactor equipped with a condenser, stirrer, thermometer, and distillation head was charged with (i) 297 grams of octadecyldimethylamine, (ii) 198 grams of 3-Chloropropyltrimethoxysilane, and (iii) 212 grams of methanol. The contents of the pressure vessel were heated to 120° C. for 24 hours while maintaining a pressure of 30 psi. The reaction conversion was measured by HCl titration and a conversion greater than 99% was achieved.

Example 2—Combination of Ionic and Non-Ionic Components

A two liter, three necked flask equipped with a condenser, stirrer, thermometer, and distillation head was charged with (i) 164 grams of propyltrimethoxysilane, (ii) 186 grams of monoethyleneglycol, and (iii) 0.6 grams of tetra isopropyltitanate was added into the mixture to facilitate a transesterification reaction to provide a non-ionic water soluble organosilane. This mixture was heated to 120° C. for two hours, during which 92 grams of methanol was recovered after which the reaction was deemed complete.

140 grams of the above reaction product were added to 84 grams of Example 1. The mixture was heated and 24 grams of methanol were recovered as distillate, leading to a 100% active final product.

Example 3—Fully Non-Ionic Composition

A two liter, three necked flask equipped with a condenser, stirrer, thermometer, and distillation head was charged with (i) 136 grams of methyltrimethoxysilane, (ii) 186 grams of monoethylene glycol, and (iii) 0.6 grams of tetra isopropyltitanate was added into the mixture to facilitate a transesterification reaction to provide a non-ionic water soluble organosilane. This mixture was heated to 120° C. for two hours, during which 92 grams of methanol were recovered after which the reaction was deemed complete.

Example 4—Fully Non Ionic Composition that is a Cohydrolysate of Two Non Ionic Silanes and Subsequently Transesterified A two liter, three necked flask equipped with a condenser, stirrer, thermometer, and distillation head was charged with 222 grams of 3-(2-Aminoethylamino)propyltrimethoxysilane, 272 grams of methyltrimethoxysilane and 50 grams of methanol. 32.4 grams of methanol and 32.4 grams of water were subsequently added into the reaction vessel. The reactants were refluxed at 80° C. for two hours to produce a cohydrolysate product. Subsequently, 0.6 grams of tetra isopropyltitanate and 550 grams of monoethylene glycol were added into the mixture to facilitate a transesterification reaction to provide a non-ionic water soluble organosilane. This mixture was heated to 120° C. for two 25 hours, during which 400 grams of methanol were recovered.

Depth of Penetration Data

A soil bed was prepared by mixing 10 ml of water into a sample 100 gm of a native soil (10% by weight, which was the optimum moisture content) and compacted manually by hand. Three such samples were prepared. Post application and drying, the mold was broken and cross-sectionally examined for the depth at which water was not being absorbed, but instead, beading up and staying on the surface. Table 1 below provides the results.

TABLE 1

Penetration Test on Compacted Soil Bed

| Sample | Dilution in Water | Penetration Depth | Spray Rate |
|---|---|---|---|
| Example 1 | 1:70 | 0.5-0.8 cm | 3 L/$m^2$ |
| Example 2 | 1:70 | 1.3-1.5 cm | 3 L/$m^2$ |

TABLE 1-continued

| Penetration Test on Compacted Soil Bed | | | |
|---|---|---|---|
| Sample | Dilution in Water | Penetration Depth | Spray Rate |
| Example 3 | 1:70 | 1.5-1.8 cm | 3 $L/m^2$ |
| Example 4 | 1:70 | 1.1-1.3 cm | 3 $L/m^2$ |

The data from Table 1 shows that as the water soluble non-ionic organosilane is utilized in higher proportions, the depth to which hydrophobicity is achieved is significantly higher, which may be particularly advantageous in a spray applications.

Improvement in Maximum Dry Density

Soil molds were prepared and optimum moisture content (OMC) and maximum dry density (MDD) was determined via a standard proctor compaction test. The results are provided in Table 2 below.

TABLE 2

| Maximum Dry Density of Soil | | | |
|---|---|---|---|
| Sample | Dosage | MDD (gm/cc) | OMC (%) |
| Control | — | 1.900 | 10.0% |
| Example 1 | 1.6 $kg/m^3$ | 1.941 | 10.5% |
| Example 2 | 1.6 $kg/m^3$ | 1.984 | 10.4% |
| Example 3 | 1.6 $kg/m^3$ | 1.982 | 10.3% |
| Example 4 | 1.6 $kg/m^3$ | 1.952 | 10.4% |

As shown in Table 2, a clear improvement is realized when an organosilane is added over the control. Additionally, the compositions including the water soluble non-ionic organosilane lead to even higher densification as can be seen from the data. While at first glance, the gain in MDD might look small, but at these densities small numerical differences provide a large improvement in load bearing capacity.

Reduction in Free Swell Index (FSI)

50 grams of two types of soil were poured into a 250 ml beaker, which was subsequently filled with water up to the 200 ml mark. The beaker was gently shaken to remove entrapped air and the soil was allowed to settle. The beaker was allowed to equilibrate for 24 hours, and the increase in volume of the soil was noted.

In the case of treated soils, the optimum moisture content (OMC) of the soil was first determined according to the proctor compaction test. Subsequently, the organosilane was mixed into OMC water, which was used to subsequently treat the soil. The soil was oven dried at 110° C. overnight and filtered through a 425-micron sieve. The swell results for the two soil is provided below in Table 3.

TABLE 3

| % Swell of Soil | | | |
|---|---|---|---|
| | Dosage | Soil 1-Swell % | Soil 2-Swell % |
| Control | — | 7% | 18% |
| Example 1 | 0.5 $kg/m^3$ | 6% | 14% |
| | 1.8 $kg/m^3$ | 4% | 10% |
| Example 2 | 0.5 $kg/m^3$ | 5% | 13% |
| | 1.8 $kg/m^3$ | 1% | 8% |
| Example 3 | 0.5 $kg/m^3$ | 6% | 12% |
| | 1.8 $kg/m^3$ | 2% | 7% |
| Example 4 | 0.5 $kg/m^3$ | 4% | 11% |
| | 1.8 $kg/m^3$ | 3% | 8% |

As can be seen from the data in Table 3, the compositions including the water soluble non-ionic organosilane generally reduce the swelling of the soil significantly more due to better penetration and higher molar density of these compositions.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A composition for soil stabilization, comprising:

(a) at least one ionic organosilicon compound comprising cationic organosilicon compound wherein the cationic organosilicon compound comprises a structure according to the formula:

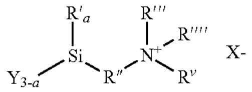

wherein

Y is an alkoxy radical with 1 to 6 carbon atoms; 'a' has a value of zero; R'' is propylene; R''' is methyl or ethyl; R'''' and $R^v$ are identical or different alkyl groups containing from one to twenty-two carbon atoms, wherein at least one of R''' and R'''' is larger is larger than eight carbon atoms, and X is a halide, acetate, or tosylate; and (b) at least one water soluble non-ionic organosilane provided in liquid form, wherein the at least one water soluble non-ionic organosilane comprises a transesterified alkoxy silane, an amino-functional silane, or a combination thereof, and wherein the at least one ionic organosilicon compound is dissolved or dispersed within the at least one water soluble non-ionic organosilane;

wherein the composition comprises a liquid and provides a hydrophobic coating upon application to a substrate.

2. The composition of claim 1, wherein the transesterified alkoxy silane comprises a structure according to the formula:

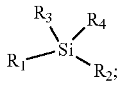

wherein $R_1$ comprises a substituted or non-substituted hydrocarbon radical;

$R_2$ comprises a first hydroxy-containing alkoxy radical;

$R_3$ comprises an alkoxy radical or a second hydroxy-containing alkoxy radical; and $R_4$ comprises an alkoxy radical or a third hydroxy-containing alkoxy radical.

3. The composition of claim 2, wherein the first hydroxy-containing alkoxy radical, the second hydroxy-containing alkoxy radical, and the third hydroxy-containing alkoxy radical are the same.

4. The composition of claim 2, wherein the first hydroxy-containing alkoxy radical is different than at least the second hydroxy-containing alkoxy radical.

5. The composition of claim 2, wherein $R_1$ comprises an alkyl radical.

6. The composition of claim 5, wherein the alkyl radical comprises a linear alkyl radical, a branched alkyl radical, or a cycloalkyl radical including from one to thirty carbon atoms.

7. The composition of claim 2, wherein $R_1$ comprises a substituted hydrocarbon radical having one or more of a halide atom, a nitrogen atom, or an oxygen atom.

8. The composition of claim 2, wherein at least the first hydroxy-containing alkoxy radical comprises $—[OCH_2CH_2]_aOH$ where 'a' has a value of 1 through 10, $—[OC_3H_6]_bOH$ where 'b' has a value of one through ten, or $[C_3H_7O_3]$.

9. The composition of claim 2, wherein the transesterified alkoxy silane comprises the first hydroxy-containing alkoxy radical and the second hydroxy-containing alkoxy radical, and wherein the first hydroxy-containing alkoxy radical and the second hydroxy-containing alkoxy radical each independently comprise $—(OCH_2CH_2)_aOH$ where 'a' has a value of 1 through 10, $—[OC_3H_6]_bOH$ where 'b' has a value of 1 through 10, or $[C_3H_7O_3]$.

10. The composition of claim 1, wherein the at least one water soluble non-ionic organosilane comprises an inherently or naturally water soluble organosilane.

11. The composition of claim 1, wherein the at least one water soluble non-ionic organosilane comprises a solubility in water of at least about 2.5 grams per Liter of water at a temperature of 20° C., such as at least about any of the following: 5, 10, 15, 20, 25, 30, 35, 40, 45, 50, 55, and 60 g/L and/or at most about 150, 140, 130, 120, 110, 100, 90, 80, 70, and 60 g/L.

12. The composition of claim 10, wherein the at least one water soluble non-ionic organosilane comprises a bis-aminofunctional silane.

13. The composition of claim 1, wherein the amino-functional silane comprises N-(2-aminoethyl)-3-aminopropyltrimethoxysilane, N-aminoethylaminomethyl)phenyltrimethoxysilane, N-(2-aminoethyl)-3-aminopropyltris(2-ethylhexoxy)-silane, 3-aminopropyltrimethoxysilane, trimethoxysilyl-propyldiethylenetriamine, bis(2-hydroxyethyl)-3-aminopropyltrimethoxysilane, 2-methacryloxyethyldimethyl-[3-trimethoxysilylpropyl] ammonium chloride, or any combination thereof.

14. The composition of claim 1, wherein the at least one water soluble non-ionic organosilane comprises a structure according to the following formula:

$$A_{(4-n)}SiY_n,$$

wherein, 'A' comprises a monovalent organic radical, 'Y' comprises a hydroxyl groups or a hydrolyzable radical, and n is 1, 2, or 3.

15. The composition of claim 14, wherein 'A' comprises an alkyl or aryl radical.

16. The composition of claim 14, wherein 'Y' comprises acetoxy radicals, alkoxy radicals with 1 to 6 carbon atoms.

17. The composition of claim 1, wherein the composition comprises at least one water soluble non-ionic organosilane comprising a transesterified alkoxy silane and at least one inherently or naturally water soluble non-ionic organosilane.

18. The composition of claim 1, wherein the composition is an aqueous solution or aqueous dispersion.

19. The compositions of claim 1, wherein the composition comprises less than 10% by weight of an organic solvent.

20. The composition of claim 1, wherein the composition is devoid of an organic solvent.

21. The composition of claim 1, wherein the composition comprises a weight ratio between the at least one water soluble non-ionic organosilane and the at least one ionic organosilicon compound comprising from about 98:2 to about 2:98.

22. The composition of claim 1, wherein the cationic organosilicon compound comprises 3-(trimethoxysilyl)propyldimethyloctadecyl ammonium chloride, 3-(trimethoxysilyl)propylmethyldidecyl ammonium chloride, or 3-(trimethoxysilyl)propyldimethylhexadecyl ammonium chloride.

23. The composition of claim 1, wherein the sum of the at least one ionic organosilicon compound and the at least one water soluble non-ionic organosilane comprises from about 5% to about 100% dissolved and/or suspended solids by weight.

24. The composition of claim 1, wherein the sum of the at least one ionic organosilicon compound and the at least one water soluble non-ionic organosilane comprises from about 0.1% to about 10% dissolved and/or suspended solids by weight.

25. The composition of claim 1, wherein the composition further comprises at least one surfactant.

26. The composition of claim 25, wherein the at least one surfactant comprises an anionic surfactant, cationic surfactant, zwitterionic surfactant, non-ionic surfactant or any combination thereof.

27. The composition of claim 1, further comprising a soil.

28. The composition of claim 27, wherein the soil comprises gravel, sand, silt, clay, or any combination thereof.

29. The composition of claim 27, wherein the composition comprises a maximum dry density (MDD) of at least about 1.5 gm/cc, such as from about 1.5 gm/cc to about 3 gm/cc.

30. A composition, comprising:

(a) at least one transesterified alkoxy silane having at least a first hydroxy-containing alkoxy radical, wherein an oxygen atom of the first hydroxy-containing alkoxy radical is bonded directly to a silicon atom; and (b) soil, wherein the soil is rendered hydrophobic by the at least one transesterified alkoxy silane;

wherein the composition comprises a maximum dry density (MDD) of at least about 1.5 gm/cc when measured at a dosage of the at least one transesterified alkoxy silane being 1.6 $kg/m^3$.

31. The composition of claim 30, wherein the soil comprises gravel, sand, silt, clay, or any combination thereof.

32. The composition of claim 30, wherein the MDD is from about 1.9 gm/cc to about 3 gm/cc.

33. A composition for soil stabilization, comprising:

(a) at least one ionic organosilicon compound; and (b) at least one water soluble non-ionic organosilane provided in liquid form, wherein the at least one water soluble non-ionic organosilane comprises a transesterified alkoxy silane having at least a first hydroxy-containing alkoxy radical, wherein an oxygen atom of the first hydroxy-containing alkoxy radical is bonded directly to a silicon atom of the at least one water soluble non-ionic organosilane;

wherein the composition provides a hydrophobic coating upon application to a substrate, and wherein a weight ratio between the at least one water soluble non-ionic organosilane and the at least one ionic organosilicon compound is from 70:30 to 50:50.

34. A composition for soil stabilization, comprising:

(a) at least one ionic organosilicon compound comprising a structure according to formula:

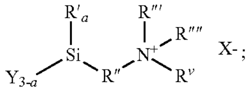

Y is an alkoxy radical or a hydroxyl-containing alkoxy radical;

'a' has a value of 0, 1, or 2;

R' is an alkyl radical;

R" is an alkylene group;

R"', R"", and $R^v$ are identical or different alkyl groups, wherein at least one or R"', R"", and $R^v$ has more than eight carbon atoms;

X is chloride, bromide, fluoride, iodide, acetate or tosylate;

(b) at least one water soluble non-ionic organosilane, wherein the at least one water soluble non-ionic organosilane comprises a transesterified alkoxy silane, an amino-functional silane, or a combination thereof;

wherein the composition comprises a liquid and provides a hydrophobic coating upon application to a substrate;

wherein a weight ratio between the at least one water soluble non-ionic organosilane and the at least one ionic organosilicon compound is from 70.30 to 50:50.

* * * * *